Figure 1:
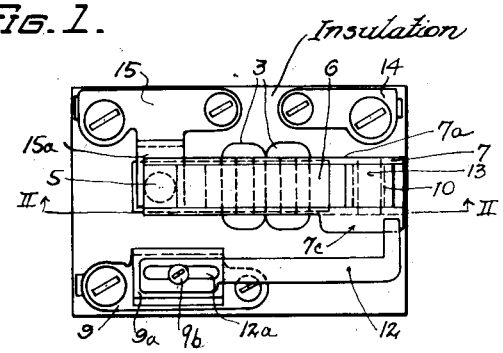

Oct. 29, 1935.   L. J. MADDEN   2,018,798
ELECTRICAL CONTROL SYSTEM
Filed May 27, 1933   2 Sheets-Sheet 1

Inventor
LOUIS J. MADDEN
By John O. Brady
Attorney

Oct. 29, 1935.                L. J. MADDEN                2,018,798
                        ELECTRICAL CONTROL SYSTEM
                         Filed May 27, 1933           2 Sheets-Sheet 2
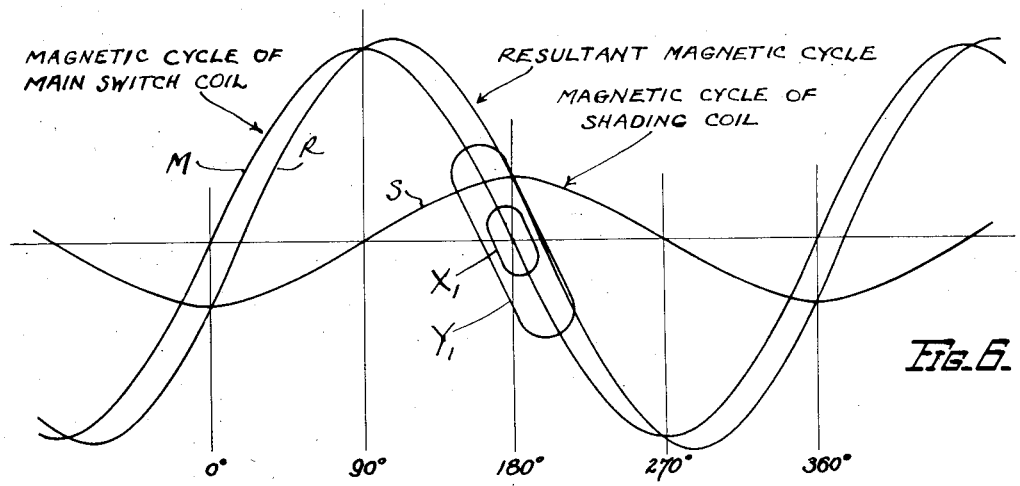
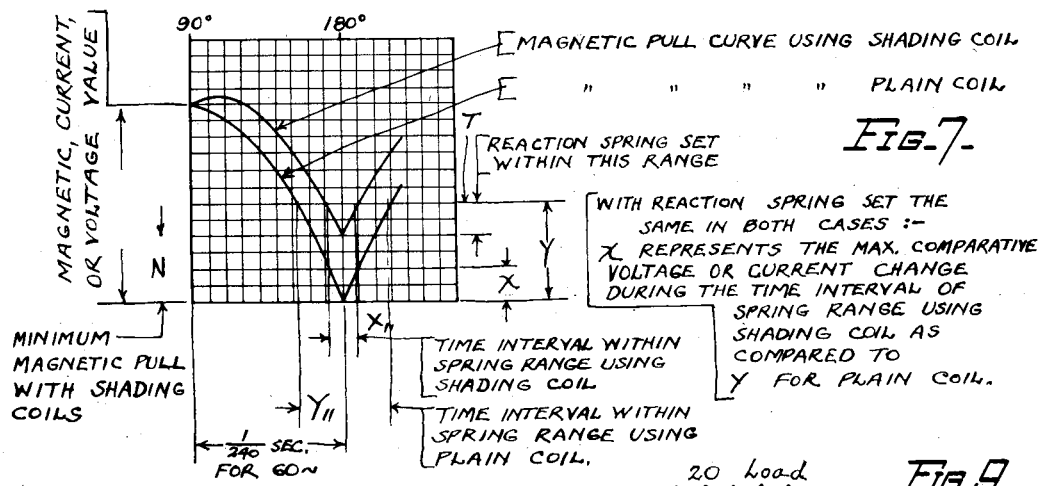
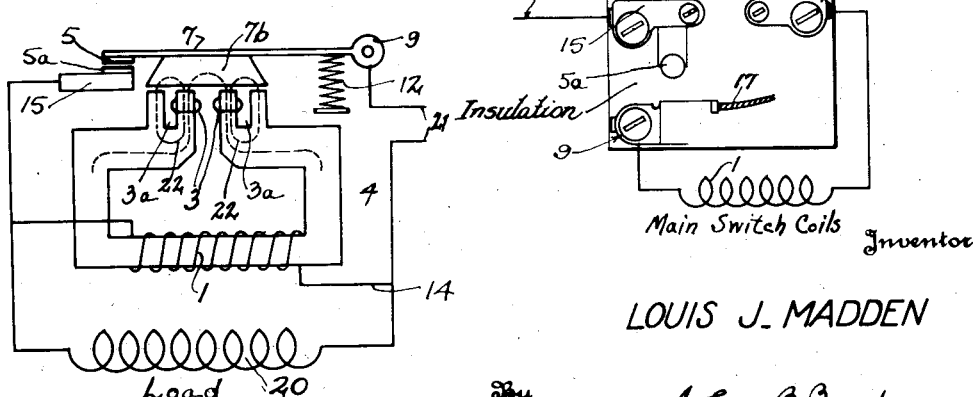
LOUIS J. MADDEN Patented Oct. 29, 1935

2,018,798

UNITED STATES PATENT OFFICE 2,018,798

ELECTRICAL CONTROL SYSTEM

Louis J. Madden, Syracuse, N. Y.

Application May 27, 1933, Serial No. 673,291

7 Claims. (Cl. 200—91)

My invention relates broadly to electrical control systems and more particularly to an alternating current switch so designed and constructed as to operate in an alternating current circuit and to open said circuit at the approximate or exact instance when the current or voltage cycle of the circuit has reached the zero point in its value.

One of the objects of my invention is to provide an electrically controlled system in which the operation of an electrical switch may be controlled with a high degree of precision for opening the control circuit at the approximate or exact instant when the current or voltage cycle of the circuit has reached the zero point of its value.

Another object of my invention is to provide an electrical control system which includes an alternating current switch which is operative under the conjoint control of a main switch coil and a shading coil for effecting the opening of the switch at the approximate or exact instant when the current or voltage cycle of the circuit has reached the zero point of its value.

Still another object of my invention is to provide a construction of electrical switch for operation in alternating current circuits wherein the contactor of the switch is controlled by the conjoint magnetic flux of a main coil and a pair of shading coils and in which the magnetic flux cycle of the main coil induces a current cycle in the shading coils having a phase angle of 90 degrees lag behind the main coil current cycle for insuring an opening of the contactor at the approximate or exact instant when the current or voltage cycle of the circuit which includes the main coil has reached the zero point of its value.

A further object of my invention is to provide a construction of electrical switch which includes a main coil and a pair of shading coils conjointly operative with respect to an armature member which carries a contactor for controlling the movement of the contactor by the conjoint flux cycle of the main coil and the shading coils and insuring the opening of the switch at the approximate or exact instant when the current or voltage cycle of the circuit which includes the main coil has reached the zero point of its value.

Still another object of my invention is to provide a construction of electric switch having a control member operative by the conjoint influence of the magnetic flux of a main coil and shading coils associated with the same magnetic system and operative conjointly with a high degree of precision for controlling the opening of a control circuit at the approximate or exact instant when the current or voltage cycle of the circuit which includes the main coil has reached the zero point of its value.

Figure 2:
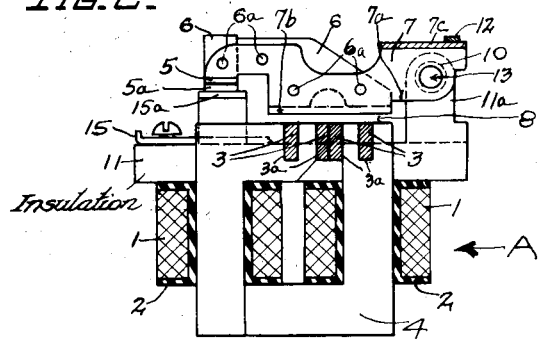
Figure 3:
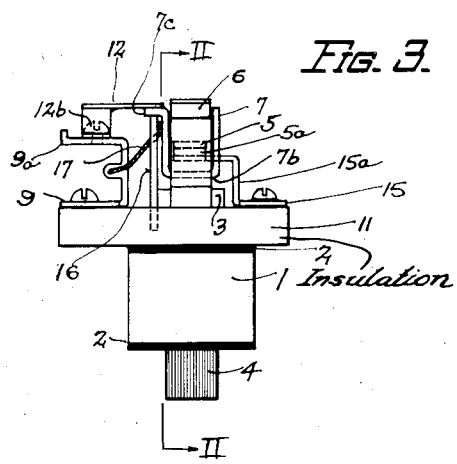
Figure 4:
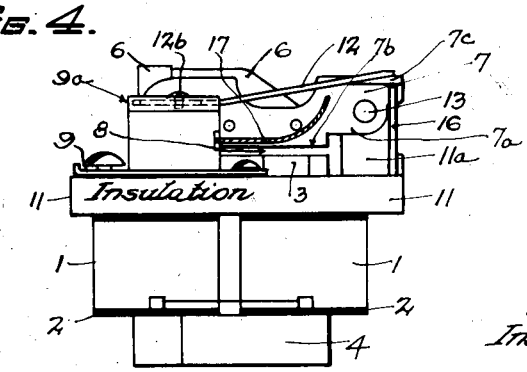
Figure 5:
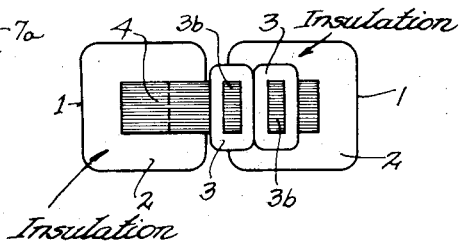

Other and further objects of my invention will be understood from the specification hereinafter following by reference to the accompanying drawings, in which:

Figure 1 is a plan view showing one form of switch construction embodying the principles of my invention; Fig. 2 is a side elevation of the switch construction with parts illustrated in cross-section along line II—II of Fig. 1 and Fig. 3; Fig. 3 is an end elevation of the switch shown in Figs. 1 and 2; Fig. 4 is a side elevation of the switch of my invention; Fig. 5 is a plan view illustrating the arrangement of the main coils and the shading coils employed in the switch construction of my invention; Fig. 6 is a diagram showing the magnetic flux cycle curves of the main switch coils and the shading coils; Fig. 7 graphically shows the relative magnetic pull curve obtainable with the use of the switch construction of my invention and showing the comparative magnetic pull which is produced by the main coils alone and by the main coils and shading coils acting conjointly; Fig. 8 diagrammatically illustrates the circuit arrangement for the main coil of the switch employed in an electrical control system in accordance with my invention and showing the relative arrangement of the shading coils with respect to the main coil where the main coils are connected in parallel with the load; and Fig. 9 illustrates a modified circuit arrangement for the main coils of the switch wherein the main coils of the switch is connected in series with the load.

Referring to the drawings in more detail, reference character 1 designates the main coils of the switch of my invention. These main coils are carried by insulated coil supports 2 which are mounted upon opposite legs of the laminated core structure shown at 4. The main coils 1 are designed to be connected in parallel with the load or in series with the load depending upon the characteristics of the load. The laminated core structure 4 forms a magnetic circuit, in the upper path of which, I provide a multiplicity of slots 3a with upwardly projecting tongues or auxiliary pole pieces 3b formed integral with the laminations of the core structure and around which, the shading coils 3 of solid copper rings are mounted. The shading coils are disposed around the upwardly projecting tongues or auxiliary pole pieces 3b for acting conjointly with the main coils 1 in the operation of the control system. A plate of insulation material, represented at 11, is supported in a substantially horizontal plane with respect to the laminated core structure 4 and immediately above the main coils 1. The plate of insulation material 11 carries plate members forming terminals 9, 14 and 15, as shown. The plate of insulation material 11 is provided with a standard which extends vertically from one end of the plate 11, as represented at 11a. The standard 11a has a horizontally extending hole adjacent the extremity thereof through which a bushing 10 extends. Bushing 10 provides a sleeve bearing for a fulcrum pin 13 which is rockably mounted therein. A sheet metal stamping forming a main lever and armature for the switch has been shown at 7 with side portions 7a extending downwardly on opposite sides of standard 11a and receiving the oppositely projecting ends of fulcrum pin 13. The sheet metal stamping, forming the main lever, is substantially channel shaped at the end which embraces the standard 11a thus increasing the strength of the main lever. The main lever 7 also serves as an armature in coaction with the main coils and shading coils of the operating system of the switch. The main lever 7 has a depending channel shaped armature portion represented at 7b which extends into close proximity to the auxiliary pole pieces 3b and is separated therefrom by the magnetic gap shown at 8, which magnetic gap extends between the armature and the shading coils, as shown. The end of the channel shaped main lever 7 is offset from the armature portion 7b and carries an upper contact illustrated at 5. This upper contact 5 connects with a lower fixed contact 5a which is supported by a bracket 15a which is connected with terminal plate 15, as shown.

In order to strengthen and insulate the main lever and armature 7, I provide a longitudinally extending insert 6 of insulation material which is riveted to opposite sides of the channel shaped lever and armature 7, as indicated at 6a. The strip of insulation material 6 projects above the sides of the channel shaped main lever and armature and serves as a bearing for automatic or manual means for effecting closing of the contacts 5 and 5a independently of the automatic switching operation thereof.

The end of the channel shaped main lever 7 adjacent the fulcrum pin 13 is laterally extended in the form of a flange at one side thereof, as represented at 7c. Against this flange, pressure is exerted by means of tension spring 12. The tension spring 12 is in the form of a strip bent at right angles and having the end thereof slotted, as at 12a, through which adjustment screw 12b extends and is secured in bracket 9a which extends from the plate member which forms the terminal 9. The tension spring 12 may be adjusted by loosening screw 12b and allowing slot 12a in tension spring 12 to be moved longitudinally with respect to adjustment screw 12b to various positions at which tension spring 12 exerts a pressure on flange 7c causing the contacts 5 and 5a of the switch to open when the other means of holding the switch closed have been removed. Such other means may be controlled by air or hydraulic pressure or by the action of a thermostat. This means bears on the upper horizontal surface of the strip of insulation material 6. The tension spring 12 may be provided with a button for shifting the tension spring to either side of the fulcrum pin 13 thereby providing a means for holding the switch constituted by contacts 5 and 5a closed until the tension spring 12 is again shifted which will allow the contacts 5 and 5a to open. In order to limit the movement of armature 7b away from the auxiliary poles and the main magnetic system of the switch, I provide a stud 16 which is supported in a vertical position in the plate of insulation shown at 11 and which provides an abutment for the other side of the flange 7c. An electrical connection is provided between the main lever 7 and the plate member forming terminal 9 through the flexible lead 17 electrically connected at one end to the bracket 9a and at the other end to the main lever 7, as shown.

The end elevational view, Fig. 3, of the switch, is taken looking in the direction of arrow A in Fig. 2. It will be seen that the standard 11a is directly aligned with the contacts 5 and 5a adjacent the remote end of the lever, as indicated in dotted lines in Fig. 3. It will be remembered that the automatic operation of the switch of my invention begins when the external force closing contacts 5 and 5a is relieved. If the current through the main coils is large at that instant, the magnetic characteristics of the switch of my invention are such that the actual opening of the circuit is delayed until the current next becomes zero or very close to zero. The cooperative effect which is obtained by the conjoint operation of the main coils and the shading coils can be more readily understood by reference to Fig. 6 which shows two flux cycle curves. The curve marked M represents the flux cycle of the main switch coil system 1. The curve marked S represents the flux cycle of the shading coils 3. The curve marked R shows the resultant magnetic cycle or the combined or actuating magnetic flux employed for the control of the armature 7b. The flux cycle of the shading coils 3 becomes the dominant factor in controlling the opening of the contacts which occurs at the time of approximate or exact maximum value of the shading coils flux cycle instead of zero value and at the approximate or exact instant when the current cycle of the main circuit is at zero. In order to simplify the explanation of the cooperative effect of the main coils 1 and the shading coils 3, I have graphically illustrated the opening range for the switch when using only the main coils 1 and without the shading coils 3 as within the wide range embraced by the time interval represented at $Y_1$ in Fig. 6. However, with the cooperative effect of the shading coils, the time period of operation of the switch is reduced to a time interval within the range $X_1$ illustrated in Fig. 6. The importance in employing the shading coils in applicant's system will be apparent. The principle will be more fully appreciated by a consideration of Fig. 7 showing the comparative magnetic pull curves of the switch when using the main coils alone and when using the shading coils in coaction with the main coils. Magnetic current or voltage values have been plotted as ordinates against time as abscissæ. The upper curve is the magnetic pull curve using the shading coils in coaction with the main coils. The lower curve is the magnetic pull curve using the main coils alone without the shading coils. The magnetic pull at the instant of zero load current using the shading coils 3 in coaction with the main coils 1 is designated by the value of the ordinate N, in contrast to the zero value obtaining when the shading coils are not used. The tension at which the reaction spring 12 is set is such that it equals the magnetic pull shown by the ordinate T. With the reaction spring set the same in both cases, the ordinate X represents the maximum comparative voltage or current change during the time interval $X_2$ within the spring range when using the shading coils 3 in coaction with the main coils 1, as compared to the change represented by the ordinate Y possible within the time interval $Y_2$ within the spring range when using the main coils 1 without the shading coils 3. The striking result which is obtained by use of the coacting shading coils and main coils is shown by the minute size of the abscissa $X_2$ which is the time interval within which a circuit opening operation is performed when using the coacting main coils and shading coils, as compared with the abscissa $Y_2$ which is the time interval required for a circuit opening operation using the main coils without the shading coils. The marked advantages of the structure of my invention which employs the coacting shading coils with the main coils will be understood when the precision operation of the switch of my invention is considered, which operation occurs at the approximate or the exact instant when the current or voltage cycle of the circuit reaches the zero point of its value.

The minimum force of the reaction spring 12 tending to open the contacts is limited by the minimum tension physically possible with a given spring and by the minimum effort required to move the mechanical parts involved. Tests have proven that this minimum force represents about 30% of the total magnetic pull of a plain coil switch which means, of course, that the switch may open when the instantaneous value of the voltage or current cycle is from 30% to 50% of their total values. Unless the opening of the contacts is instantaneous, the values may be much higher on the accelerating side of the cycle.

With further reference to Fig. 7, it will be noted that the minimum magnetic pull N with the shading coils introduced is substantially less than the given spring reaction T. In this case, the maximum voltage or current value in the main coil circuit cycle represented by X is under 17% of the total value, as compared to 50% for the plain coil switch under similar conditions of reacting forces. (See opening range represented in Fig. 6 by "$Y_1$" for main coil switch and "$X_1$" for combination of shading coils with main coils.) Note the comparative time interval values with and without shading coils shown in Fig. 6.

Referring to Figure 8, I have shown a circuit arrangement for the control system of my invention wherein the main coil 1 of the switch system is in parallel to the load designated at 20. The connections for the switch have been shown schematically, that is, the power circuit of power line system 21 is connected through terminal 9 to the lever 7 which carries the upper contact 5 which contacts with the lower contact 5a connected to terminal 15 to the main coils 1 which connect to the other side of the power line 21 through terminal 14. When the circuit is closed through contacts 5 and 5a, the circuit to the load 20 is closed. When the circuit to the contacts 5 and 5a is opened, then the current to the load is cut off. The tension spring 12 has been diagrammatically illustrated in Fig. 8 as tending to normally maintain the circuit open by separating contacts 5 and 5a. The shading coils are assembled in the slots 3a in the pole tips of the core structure 4. These shading coils consist of one or more bands of conductive material which form a closed circuit. The magnetic flux cycle of the main coil 1 induces a current cycle in the shading coils having a fixed angle of 90° lag behind the main coil current cycle, which in turn, gives a corresponding flux cycle represented by the dotted lines 22. The value of the flux cycle is controlled by the design of the shading coils but this must always be less than the value of the main coil flux. The shading coils coact with the main coils in the control of the movement of armature member 7b.

As illustrated in Fig. 9, the switch system may be connected in series relation to the load 20. In this arrangement, the circuit to the power line at 21 connects to terminal 15 and lower contact 5a and from upper contact 5 through lever 7, through flexible connector 17 to terminal 9 and then through the main switch coils 1 to terminal 14 returning through the load 20 to the other side of the power system. The opening of contacts 5 and 5a, under control of the main coils 1 and shading coils 3, results in the opening of the circuit to the load 20.

In both arrangements, the actuation of lever member 7 is effected when the alternating current in the circuit in which the switch is connected has reached the zero point of its value. The operation of the switch is effected within an extremely short interval of time.

While I have described the switch of my invention in certain preferred embodiments, I desire that modifications may be made in the switch structure as I am fully aware that different types of switches may be employed in control systems embodying the principles of my invention and I intend no limitations upon my invention other than may be imposed within the scope of the appended claims.

What I claim as new and desire to secure by Letters Patent of the United States is as follows:

1. In an electrical control system, a magnetic core structure, poles for said core structure, a main coil structure associated with said core structure, a shading coil associated with each of said poles, a pivotally mounted lever mounted adjacent said poles, an armature carried by said lever and aligned with said poles, a fixed contact adjacent one end of said lever, a movable contact carried by said lever and aligned with said fixed contact, a flange on said lever extending on opposite sides of the pivotal mounting thereof, and a tension spring adjustable to selected positions along said flange for controlling the operation of said lever in opposition to the magnetic attraction of said main coil and said shading coil, said tension spring being effective to open said contacts against the minimum magnetic attraction of said coils.

2. In an electrical control system, a magnetic core structure, pole pieces on said magnetic core structure, main coils carried by said core structure, shading coils associated with said pole pieces, an insulated support connected with said core structure, a lever member pivotally mounted with respect to said insulated support, an armature carried by said lever member in alignment with said pole pieces, a fixed contact mounted on said insulated support, a contact carried by said lever member in alignment with said fixed contact, a stop on said insulated support for limiting the movement of said lever in one direction, and spring means for continuously urging said lever in one direction, the magnetic flux cycle of said main coil coacting with the magnetic flux cycle of said shading coils for cooperatively controlling the tendency in the opposite direction, the magnetic attraction exceeding the force of said spring means and effective to hold said contacts closed for values of current in said main coil above a predetermined minimum.

3. In an electrical control system, a magnetic core structure, pole pieces connected with said core structure, shading coils directly associated with each of said pole pieces, a main coil associated with said magnetic core structure, an insulated support adjacent said magnetic core structure, a lever member pivotally mounted with respect to said insulated support, an armature carried by said lever member in alignment with said pole pieces, a fixed contact carried by said insulated support, the contact carried by said lever member and aligned with said fixed contact, a bracket on said insulated support, a spring strip slotted at one end and adjustably mounted on said bracket, the end of said spring strip being selectively engageable on the top of said lever member for determining the moment exerted at said pivotal mounting through said lever, the maximum moment produced by the magnetic flux of said shading coils determining the mimimum moment to be exerted by said spring strip.

4. In an electrical control system, a magnetic core structure, pole pieces for said core structure, shading coils on said pole pieces, a main coil associated with said magnetic core structure, an insulated support adjacent said magnetic core structure, a vertically disposed standard carried by said insulated support, a channel shaped member pivotally mounted at one end with respect to said standard, an armature carried by said channel shaped member in alignment with said pole pieces, a fixed contact mounted on said support, and a movable contact carried by said channel shaped member in alignment with said fixed contact, a spring member normally operative in said channel shaped member to hold said contacts open, the magnetic flux cycle of said shading coils coacting with the magnetic flux cycle of said main coil for cooperatively controlling the movement of said armature against the action of said spring member for all values of current in said main coil.

5. In an electrical control system, a magnetic core structure, pole pieces for said core structure, shading coils on said pole pieces, a main coil associated with said magnetic core structure, an insulated support adjacent said magnetic core structure, a vertically disposed standard carried by said insulated support, a channel shaped member having the sides thereof extending downwardly adjacent one end and embracing said standard and pivotally mounted with respect thereto, and having the intermediate and the side walls of the opposite end thereof extending upwardly, an insulation strip disposed between the upwardly extending side walls of the channel shaped member and providing an insulated operating member therefor, a contact carried by the end of said channel shaped member, a fixed contact carried by said insulated support in alignment with the aforesaid contact, an armature formed by the intermediate portion of said channel shaped member in alignment with said pole pieces, a spring member normally operative on said channel shaped member to hold said contacts open, and external means for closing said contacts and holding said contacts closed, the flux cycle of said main coil combining with the flux cycle of said shading coils for cooperatively controlling the movement of said armature against the action of said spring member when said external holding means is released.

6. In an alternating current electrical control system, an electrical switch comprising a core structure, main field coils, pole pieces, shading coils disposed in the pole faces of said pole pieces, an armature pivotally mounted with respect to said pole pieces, electrical contacts operated by said armature, variable spring means tending to hold said contacts open, and means comprising said main coils and said shading coils for producing a magnetic field cooperatively effective on said armature, said spring means adjustably mounted for producing an opposite tension greater than the magnetic attraction at the condition of zero current through said main coils.

7. In an alternating current electrical control system, an electrical switch comprising a core structure, main field coils, pole pieces, shading coils disposed in the pole faces of said pole pieces, an armature pivotally mounted with respect to said pole pieces, electrical contacts operated by said armature held closed by an external force, variable tension spring means tending to open said contacts, and means comprising said main coils and said shading coils for producing a magnetic field cooperatively effective on said armature, said spring means adjustably mounted for producing an opposite tension greater than the magnetic attraction at the condition of zero current through said main coils, the greater tension of said spring means effective to open said contacts when the external force holding said contacts closed is removed.

LOUIS J. MADDEN.